No. 662,050. Patented Nov. 20, 1900.
A. H. WORREST.
THILL COUPLING.
(Application filed May 8, 1900.)
(No Model.) 2 Sheets—Sheet 1.
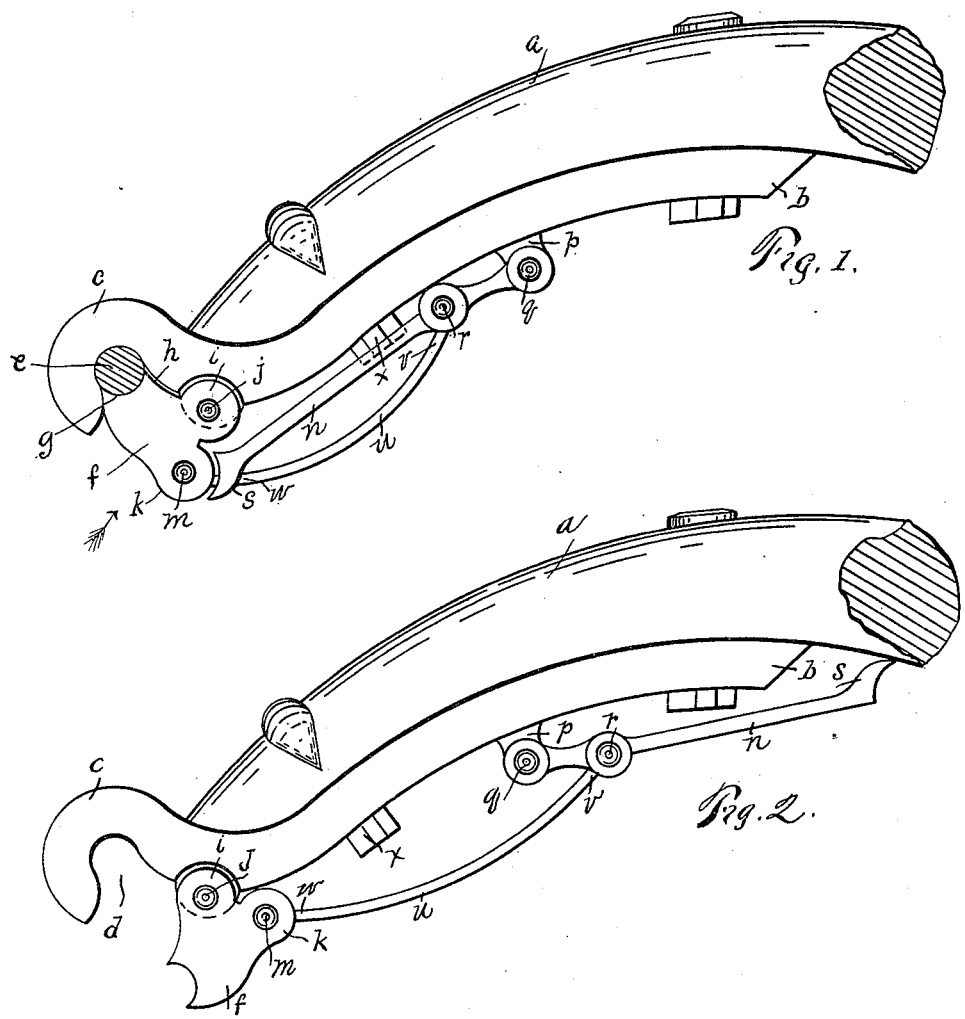

No. 662,050. Patented Nov. 20, 1900.
A. H. WORREST.
THILL COUPLING.
(Application filed May 8, 1900.)
(No Model.) 2 Sheets—Sheet 2.

Witnesses
H. H. W. Greiner
C. G. Bassler

Inventor
Alfred H. Worrest
By
Wm. R. Gerhart,
Attorney

THE NORRIS PETERS CO., PHOTO-LITHO., WASHINGTON, D. C.

UNITED STATES PATENT OFFICE.

ALFRED H. WORREST, OF LANCASTER, PENNSYLVANIA, ASSIGNOR TO THE METAL STAMPING COMPANY, OF NEW YORK, N. Y.

THILL-COUPLING.

SPECIFICATION forming part of Letters Patent No. 662,050, dated November 20, 1900.

Application filed May 8, 1900. Serial No. 15,903. (No model.)

*To all whom it may concern:*

Be it known that I, ALFRED H. WORREST, a citizen of the United States, residing at Lancaster, in the county of Lancaster and State of Pennsylvania, have invented certain Improvements in Thill-Couplings, of which the following is a specification.

This invention relates to improvements in thill-couplings wherein the wear of the coupling-bolt is automatically taken up; and the objects of my improvements are, first, to close the opening in the thill-iron wherethrough the coupling-bolt is connected with the thill by a dog which automatically takes up the wear of said bolt; second, to control the dog through a mechanism that is when in use practically unobservable; third, to control the loop through a flat curved spring; fourth, to control the spring that closes and holds the dog through a lever the free end of which swings forward in close relation to the thill-iron, and, fifth, to close the dog by a lever that automatically prevents said dog from opening.

The invention consists in the construction and combination of the various parts, as hereinafter fully described and then pointed out in the claims.

Figure 3:
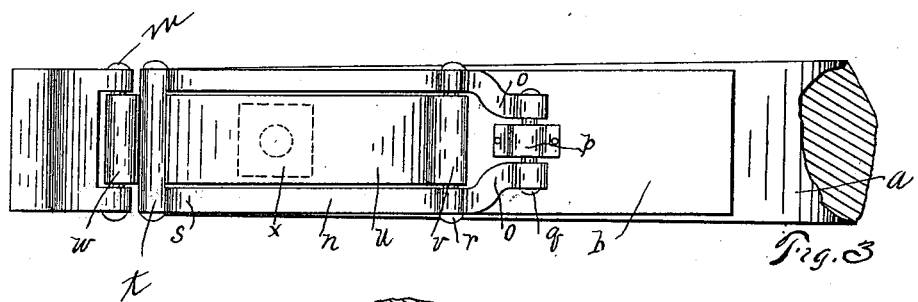
Figure 4:
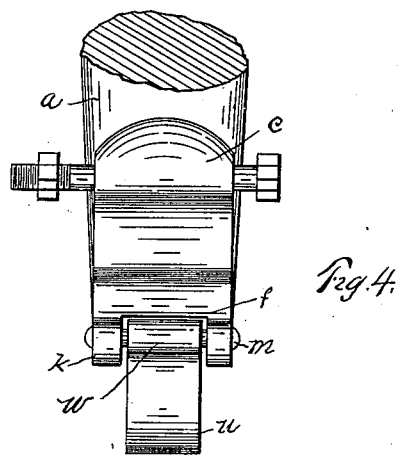
Figure 5:
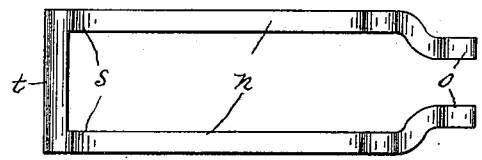
Figure 6:
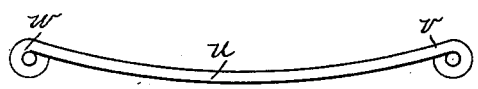

In the accompanying drawings, which form a part of this specification, Figure 1 is a side elevation of the invention, the thill being shown locked to a coupling-bolt; and Fig. 2 a similar view of the thill, but showing the same detached and the dog open. Fig. 3 is a bottom plan view of the invention. Fig. 4 is a view of Fig. 1 from the direction of arrow 1. Fig. 5 is a plan view of the operating-lever detached, and Fig. 6 a side view of the spring detached.

Similar letters indicate like parts throughout the several views.

Referring to the details of the drawings, $a$ indicates the thill; $b$, the thill-iron; $c$, the hook-eye that takes over the coupling-bolt; $d$, the opening in the under side of the hook-eye, and $e$ the coupling-bolt.

$f$ is a dog adapted to enter the opening $d$ in the under side of the hook-eye and engage the coupling-bolt $e$. The dog has a recess in its free end that it may fit snugly up to said bolt, as shown at $g$, and the dog is of less width than opening $d$, as shown at $h$, Fig. 1, to permit it to enter farther through said opening $d$ and take up the wear of the coupling-bolt. On the rear of the lower end of dog $f$ are two lips $i$, that embrace a lug on the thill-iron $b$, and to which they are secured by a hinge-pin $j$. On the front of the lower end of the dog there are also lips $k$, similar to lips $i$, and through said lips $k$ passes a hinge-bolt $m$ for a purpose to be described. When the dog is in a closed position, the lips $k$ are located somewhat behind the lips $i$, as shown in Fig. 1.

$n$ indicates a link-shaped lever, the ends $o$ whereof embrace a perforated lug $p$, located on the under side of thill-iron $b$ and in front of the pivot of dog $f$, and lever $n$ is connected with the thill-iron by a hinge-pin $q$, passing through the ends $o$ of said lever and the lug $p$. Through openings in lever $n$, located between ends $o$ and the swinging end thereof, is a round cross-bar $r$, and the swinging ends $s$ of the side bars of the lever are turned somewhat downward and have concave outer faces, as shown and for a purpose to be described, and said outer ends $s$ are connected by a cross-bar $t$ to serve as a handle wherewith said lever may be operated.

$u$ is a flat spring having the end $v$ hinged to cross-bar $r$ adjacent to the fulcrum of the lever, and the end $w$ of the spring is hinged to the hinge-pin $m$, passing through lips $k$ of the dog $f$. Whether the dog is open or closed, the spring is always curved outward, but more so when the dog is closed. In Fig. 1 is shown the position of the parts when the dog is closed, and it will be observed that in said figure the cross-bar $r$, to which the front end of the spring is hinged, lies above a line between the axis of the fulcrum of the lever and the axis of the hinge-pin $m$, to which the rear end of the spring is hinged; that the spring passes above cross-bar $t$, connecting the swinging ends of the lever; that the side bars of the lever embrace the nut $x$ and prevent it from turning, and that the swinging end of the lever is in such position as to engage the lips $k$ of dog $f$ should said dog for any reason be forced downward, and thus prevent the uncoupling of the thills. Fig. 2 shows the parts in the positions they occupy when the dog is fully open. It will readily be seen in this figure that the spring holds the parts in an open position, just as it holds them in a closed position in Fig. 1.

I do not restrict myself to the details of construction herein shown and described, as it is obvious that many alterations may be made therein without departing from the principle and scope of my invention.

Having thus described my invention, what I claim as new, and desire to secure by Letters Patent, is—

1. The combination, in a thill-coupling, of the coupling-bolt, a hook-eye connected with the thill and having the opening in its under side, a pivoted dog adapted to enter said opening and engage the coupling-bolt, a lever separated from the dog, and a spring having one end secured to the dog and the other end to the lever, for the purpose specified.

2. The combination, in a thill-coupling, of the coupling-bolt, a hook-eye connected with the thill and having the opening in the under side, a pivoted dog adapted to enter said opening and engage the coupling-bolt, a lever separated from the dog, and a spring having one end pivoted to the dog and the other end pivoted to the lever, for the purpose specified.

3. The combination, in a thill-coupling, of the coupling-bolt, a hook-eye connected with the thill and having the opening in the under side, a pivoted dog having a lip thereon and adapted to enter said opening and engage the coupling-bolt, a lever separate from the dog, and a spring having one end pivoted to the lip of the dog and the other end secured to the lever, for the purpose specified.

4. The combination, in a thill-coupling, of the coupling-bolt, a hook-eye connected with the thill and having the opening in the under side, a pivoted dog having a lip thereon and adapted to enter said opening and engage the coupling-bolt, a lever separate from the dog and having its free end adapted to be engaged by the lip on the dog when said dog is in a closed position, and a spring having one end pivoted to the dog and the other end secured to the lever, for the purpose specified.

5. The combination, in a thill-coupling, of the coupling-bolt, a hook-eye connected with the thill and having the opening in the under side, a pivoted dog having a lip thereon and adapted to enter said opening and engage the coupling-bolt, a lever separate from the dog and having its free end adapted to be engaged by the lip on the dog when said dog is in a closed position, and a spring having one end pivoted to the lip of the dog and the other end connected with the lever, for the purpose specified.

6. The combination, in a thill-coupling, of the coupling-bolt, a hook-eye connected with the thill and having the opening in the under side, a dog pivoted below said bolt, a lever fulcrumed to the thill and in front of the dog, a downwardly-curved spring having one end pivoted to the dog below the pivot of said dog and the other end pivoted to the lever between the dog and the fulcrum of said lever, for the purpose specified.

7. The combination, in a thill-coupling, of the coupling-bolt, a hook-eye connected with the thill and having the opening in the under side, a dog pivoted below said bolt and having a lip located below said pivot, a lever fulcrumed to the thill and in front of the dog and having its free end adapted to be engaged by the lip on the dog when said dog is in a closed position, and a downwardly-curved spring having one end pivoted to the lip on the dog and the other end pivoted to the lever between the dog and the fulcrum of said lever, for the purpose specified.

8. The combination, in a thill-coupling, of the coupling-bolt, a hook-eye connected with the thill and having the opening in the under side, a dog pivoted below and in front of said bolt, a lip on the dog and located somewhat behind said pivot when the dog is in a closed position, a link-shaped lever fulcrumed to the thill in front of the dog and having its free end adapted to be engaged by the lip on the dog when said dog is in a closed position, and a downwardly-curved spring having one end pivoted to a cross-piece of the lever and inside of said fulcrum and then extended backward above the cross-piece of the free end of the lever and attached to a hinge-pin in the lip of the dog, the parts and their connections bearing such relation the one to the other that when the dog is opened or closed the lever must be thrown over its fulcrum and that when the dog is open or closed the spring will hold it in such position, substantially as and for the purpose specified.

9. The combination, in a thill-coupling, of the coupling-bolt, a hook-eye having an opening therein, a dog adapted to enter said opening, a bolt connecting the thill-iron and the thill, a nut on the bolt, a link-shaped lever constructed to embrace said nut and prevent it from turning, and an operating connection between the lever and the dog, for the purpose specified.

ALFRED H. WORREST.

Witnesses:
C. G. BASSLER,
WM. R. GERHART.